US008481099B2

(12) United States Patent
Nafisi-Movaghar et al.

(10) Patent No.: US 8,481,099 B2
(45) Date of Patent: Jul. 9, 2013

(54) PROCESS FOR CONVERSION OF CITRUS PEELS INTO FIBER, JUICE, NARINGIN, AND OIL

(75) Inventors: Karim Nafisi-Movaghar, Walnut Creek, CA (US); Loren L. Druz, Clayton, CA (US); Claudine Pepper Victoria, Fremont, CA (US)

(73) Assignee: Del Monte Corporation, San Francisco, CA (US)

( * ) Notice: Subject to any disclaimer, the term of this patent is extended or adjusted under 35 U.S.C. 154(b) by 0 days.

(21) Appl. No.: 13/230,469

(22) Filed: Sep. 12, 2011

(65) Prior Publication Data

US 2013/0064947 A1  Mar. 14, 2013

(51) Int. Cl.
  A23L 1/28 (2006.01)
(52) U.S. Cl.
  USPC ........... 426/489; 426/487; 426/478; 426/479; 426/482; 426/599; 426/431; 426/387
(58) Field of Classification Search
  USPC ................. 426/489, 487, 478, 479, 482, 599, 426/431, 387
  See application file for complete search history.

(56) References Cited

U.S. PATENT DOCUMENTS

| | | | | | |
|---|---|---|---|---|---|
| 2,186,907 | A | * | 1/1940 | Overton et al. | 426/472 |
| 2,420,680 | A | * | 5/1947 | Pipkin | 100/37 |
| 2,458,171 | A | * | 1/1949 | Jansen et al. | 435/197 |
| 2,548,895 | A | * | 4/1951 | Graham et al. | 536/2 |
| 2,574,922 | A | * | 11/1951 | Karp et al. | 100/105 |
| 2,614,048 | A | * | 10/1952 | Wenzelberger | 426/384 |
| 2,708,627 | A | * | 5/1955 | Toulmin, Jr. | 426/429 |
| 2,788,736 | A | * | 4/1957 | Bardini | 100/232 |
| 2,799,215 | A | * | 7/1957 | De Roo | 454/287 |
| 3,093,630 | A | * | 6/1963 | Muncie | 426/651 |
| 3,112,202 | A | | 11/1963 | Wadsworth | |
| 3,183,825 | A | * | 5/1965 | James | 100/98 R |
| 3,598,841 | A | * | 8/1971 | Swift | 549/403 |

(Continued)

FOREIGN PATENT DOCUMENTS

FR  2606599  *  5/1988
JP  52-110899  *  9/1977

(Continued)

OTHER PUBLICATIONS

Laustsen, Karen "Dietary Fiber from Citrus Peel" Ingredients, food Marketing & Techonology, Apr. 2011.

(Continued)

Primary Examiner — Anthony Weier
(74) Attorney, Agent, or Firm — Dilworth Paxson LLP

(57) ABSTRACT

Processes for converting by-products of citrus, such as peels and juice from juice sacs attached to the peel after hand or mechanical peeling into high quality dietary fiber, naringin, juice, and oil. The processes involve pressing peels to release juice from vesicles and then grinding peels in water to create a slurry. Peel color and oil is removed by a flotation technique. Decolorized citrus peel particles—or pulp—are debittered with water in steps of boiling and washing. Dietary fiber obtained after debittering is dried and packaged for commercial use. The process promotes environmental responsibility by reducing standard citrus waste—a high BOD waste product, by overcoming discharging problems with industrial waste, by converting an environmentally undesirable product—peels, juice, and oils—into a value-added ingredient, by drastically reducing discharge and penalty cost of waste, and by eliminating the use of solvents that generate pollution.

47 Claims, 3 Drawing Sheets

U.S. PATENT DOCUMENTS

| | | | |
|---|---|---|---|
| 3,868,466 A * | 2/1975 | Swisher | 426/616 |
| 3,966,984 A * | 6/1976 | Cocke et al. | 426/472 |
| 4,113,573 A * | 9/1978 | Gerow | 203/2 |
| 4,225,625 A * | 9/1980 | Gerow | 426/482 |
| 4,326,926 A * | 4/1982 | Gerow | 203/91 |
| 4,334,962 A * | 6/1982 | Gerow | 202/185.1 |
| 4,931,297 A | 6/1990 | Malyniak et al. | |
| 4,996,070 A * | 2/1991 | Nafisi-Movaghar | 426/330.5 |
| 5,077,206 A * | 12/1991 | Cheetham et al. | 435/99 |
| 5,656,734 A * | 8/1997 | Ehrlich | 536/2 |
| 6,151,799 A * | 11/2000 | Jones | 34/378 |
| 6,183,806 B1 * | 2/2001 | Ficca et al. | 426/616 |
| 6,350,477 B1 * | 2/2002 | Yamamoto et al. | 424/736 |
| 6,523,496 B1 | 2/2003 | Keithly et al. | |
| 7,060,313 B2 * | 6/2006 | Jones | 426/489 |
| 7,201,928 B1 * | 4/2007 | Huang et al. | 424/736 |
| 7,485,332 B2 * | 2/2009 | Chu et al. | 426/616 |
| 7,629,010 B2 * | 12/2009 | Passarelli et al. | 426/425 |
| RE41,537 E | 8/2010 | Chu et al. | |
| 2003/0091713 A1 * | 5/2003 | Inoue et al. | 426/534 |
| 2003/0185956 A1 * | 10/2003 | Gradley | 426/534 |
| 2006/0188621 A1 * | 8/2006 | Jones | 426/489 |
| 2007/0042972 A1 * | 2/2007 | McKeever et al. | 514/27 |
| 2007/0065527 A1 * | 3/2007 | Medvedev et al. | 424/736 |
| 2007/0088078 A1 * | 4/2007 | Dushenkov et al. | 514/456 |
| 2011/0028426 A1 * | 2/2011 | Trudsoe et al. | 514/54 |
| 2011/0123653 A1 * | 5/2011 | McKeever et al. | 424/736 |

FOREIGN PATENT DOCUMENTS

| | | | |
|---|---|---|---|
| JP | 55-52301 | * | 4/1980 |
| JP | 56-134996 | * | 10/1981 |
| JP | 57-26583 | * | 2/1982 |
| JP | 57-26584 | * | 2/1982 |
| JP | 57-43679 | * | 3/1982 |
| JP | 57-125689 | * | 8/1982 |
| JP | 57155988 | * | 9/1982 |
| JP | 59-59185 | * | 4/1984 |
| JP | 59-151845 | * | 8/1984 |
| JP | 8-224071 | * | 9/1996 |
| JP | 2004-210682 | * | 7/2004 |

OTHER PUBLICATIONS

Figuerola, Fernando et al. "Fibre concenhates from apple pomace and citrus peel as potential fibre sources for food enrichment" Elsevier Sci Ltd, Food Chemistry 91 (3): 395-401 Jul. 2005; http://captura.uchile.cl/jspui/bitstream/2250/2304/1/_Figuerola_F.pdf.

Oehlbeck, Barbara "Rebirth of citrus peel processing looks promising" Copyright © 2008, Farmer & Rancher Newspaper, http://www.farmerandrancher.com/09%20SEPT%202008/Citrus%20Peel.html.

* cited by examiner

PROCESS FOR CONVERSION OF CITRUS PEELS INTO FIBER, JUICE, NARINGIN, AND OIL

FIELD OF THE INVENTION

The invention relates to apparatus, systems, and processes for converting citrus peels into fiber, juice, naringin, and oil.

BACKGROUND OF THE INVENTION

Large scale industrial processing of citrus fruits into juices, canned fruit, fruit salads and other food products generates large volumes of citrus peels as a byproduct. The entire peeling process may be performed manually with specialized knives or mechanically with equipment such as citrus fruit juicers. Many vesicles—juice sacs—are left attached to a citrus peel. Much of citrus mill effluents—peel, rag, seed, pulp, etc.—are dewatered, chopped, kiln dried, or sold as animal feed. It is however well known that citrus peels contain useful and edible components. There is an ongoing commercial interest in identifying uses for left over citrus peels and reducing the environmental impact posed by waste from citrus processing.

As people are becoming more health conscious, interest in dietary fiber intake has increased. Dietary fibers from other fiber sources are used more frequently than those from fruit; however, fruit fiber is a high quality dietary fiber. As compared to other forms of fiber, fruit fiber has a higher total and soluble fiber content, water binding capacity, oil absorbing capacity, and colonic fermentability, as well as lower phytic acid content and caloric value. For example, residues from orange juice extraction are recognized as a potentially excellent source of dietary fiber because this material is rich in pectin and is available in large quantities. Citrus-derived fruit fibers are expected to have better quality than other dietary fibers because of the presence of bioactive compounds, such as flavonoids, polyphenols, and carotenes.

Intact citrus peels comprise two regions—albedo and flavedo. Albedo is known for its dietary fiber content including sugar, cellulose, and pectic substances. It has been used as a filler material to fortify stock food. Flavedo is known for containing Vitamin A, carotenes, and xanthophylls. It has been used as a coloring agent in the preparation of food stuffs, a clouding agent in fruit juice drinks, and a fortifier of livestock feed and human food. Dried citrus peels or pulp by-products and waste, which are highly absorptive, have been used as poultry bedding.

Citrus fruit by-products, such as the peels and pulp, can be processed in many different ways to obtain food or feed additives. For example, U.S. Pat. No. 4,225,625 teaches a method for separating citrus peels into separate albedo and flavedo components for later use. In the invention taught by U.S. Pat. No. 7,060,313, citrus peel and pulp with juice removed are processed to recover components of value such as, d-limonene, molasses, pectin pomace, and food grade quality peel mass. Other methods convert dried citrus peels to animal feed, as taught by U.S. Pat. No. 2,186,907, and to food additives, as taught by U.S. Pat. No. 3,868,466. Yet another example of converting citrus by-products is provided by U.S. Pat. No. 7,629,010 which teaches methods for recovering citrus fiber from citrus vesicles using organic solvents to obtain a food additive for beverages, baked goods, meat or meat emulsions, confectionary, jams, jellies. This method uses organic solvents, as does the method taught by U.S. Pat. No. 6,183,806 for making citrus fruit peel extracts and flour. Collecting citrus oil, as taught by U.S. Pat. No. 6,151,799, is another way to process useful components from citrus peels.

Citrus processing creates substantial waste in the form of peels, seeds, rag, and pulp. The U.S. regulatory environment places restrictions on disposal of waste emissions from citrus plants. As a consequence, citrus peel waste cannot be dumped into landfills, but must be converted into useable products, such as stock feed. The conversion is a costly add-on expense for citrus plant operators.

The foregoing is believed to describe the prior art processes. While the above prior art processes provide for extracting citrus by-products for use, one drawback of the prior art is that the processes are costly and impractical because unnecessary processing steps are used, for example, separating albedo from flavedo of citrus peels. Another drawback is the need to use pollution generating solvents to extract components of citrus by-products. A further drawback is that unnecessary processing and pollution generating solvent-based processing increase operating costs and maintenance. Furthermore, the use of pollution generating solvents requires operational control to meet regulatory framework and could have an adverse impact on the environment.

This invention overcomes the drawbacks of the prior art. This invention provides processes to convert standard citrus waste—a high biochemical oxygen demand (B.O.D.) product—into value added commercial products, to reduce or eliminate discharge problems associated with industrial waste, to drastically reduce discharge and penalty costs for handling waste, and to provide a water-based process thus eliminating the use of environmental pollutants such as organic solvents.

BRIEF DESCRIPTION OF THE DRAWINGS

Additional aspects, features, and advantages of the invention, as to its operation, will be understood and will become more readily apparent when the invention is considered in light of the following description of illustrative embodiments made in conjunction with the accompanying drawings, wherein.

DETAILED DESCRIPTION

Over 38 million tons of citrus are used annually to produce juice. Consequently, citrus juice extraction produces significant volumes of peel, seed, rag, and pulp waste. This organic waste cannot be disposed of in a landfill because it is a high B.O.D. waste product, but must be processed into commercial products such as stock feed or citrus oils to reduce the environmental impact of the sheer volume and content of citrus waste. One purpose of the invention is to convert the standard waste—peels, residual juice, and oils—into the following commercial-ready products: high quality dietary fiber, potable citrus juice, naringin, and citrus oil. Another purpose of the invention is to reduce industrial waste created by citrus juice extraction. This reduction diminishes costs and fees for processing waste. It also mitigates risk exposure to penalties related to disposal or discharge violations. A further purpose of the invention is to eliminate pollution-generating solvents used to convert citrus waste into useable products by providing a water-based process for converting citrus peels.

Figure 1:
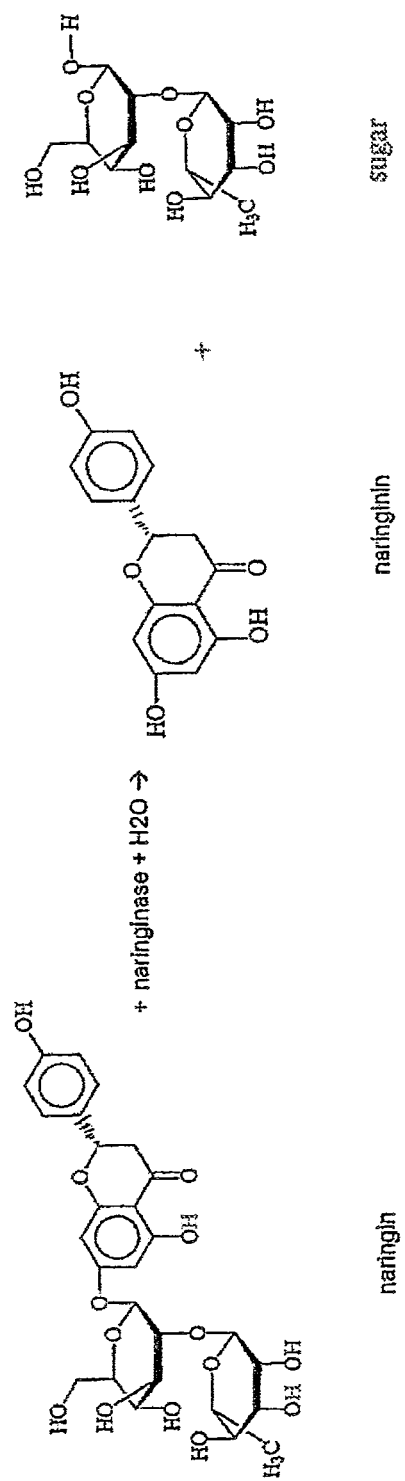
FIG. 1 describes the hydrolysis pathway of naringin into naringinin using the enzyme naringinase.

Illustrative and alternative embodiments and operational details of the processes for converting citrus peels into fiber, juice, naringin, and oil are discussed in detail below with reference to FIGS. 1 through 3. The processes of the invention may take place in large scale commercial operations whereby each step is automated with industrial machinery, carried out manually, or executed with some combination of both. The term "citrus" takes on its ordinary meaning and refers generally to oranges, grapefruits, kumquats, pomelos, tangelos, citrange, citron, lemons, limes, mandarins, tangerines, and the like.

Citrus juice is extracted by hand or by machine from the fleshy inner part of citrus. The fleshy inner part of the citrus comprises pectinaceous and cellulosic pulp vesicles, which are also referred to as, citrus vesicles, citrus cells, pulp, or juice sacs. The phrase "juice sacs" is used generally throughout this disclosure to refer to the pulp vesicles. In commercial processing, citrus is washed, juiced, and strained to remove peel and rag. Extracting juice may be performed by separating the inner flesh from the peel with a specialized utensil and then squeezing the flesh to release juice from the juice sacs. Juice extraction may occur by automation with industrial machinery that presses whole or halved citrus to release juice from the juice sacs. Either extraction process—manual or mechanical—generates a considerable amount of peels.

Citrus peel waste produced by juice or fruit segmenting operations contains valuable and extractable products. For example, the juice sacs attached to cut or pressed peels—which are typically discarded—contain considerable amounts of citrus juice that can be extracted and refined for consumption. Citrus peels and juice contains bitter components, including naringin—a soluble flavanone glycoside—and limonin—a soluble furanolactone. These citrus components can be extracted with solvents such as ethanol and water and later refined for use. Naringin—a powerful antioxidant—is available commercially as a nutritional supplement. Dietary fruit fiber and citrus oil are also present in citrus peels and can also be extracted for use.

Extracting Juice by Pressing Citrus Peels

Figure 2:
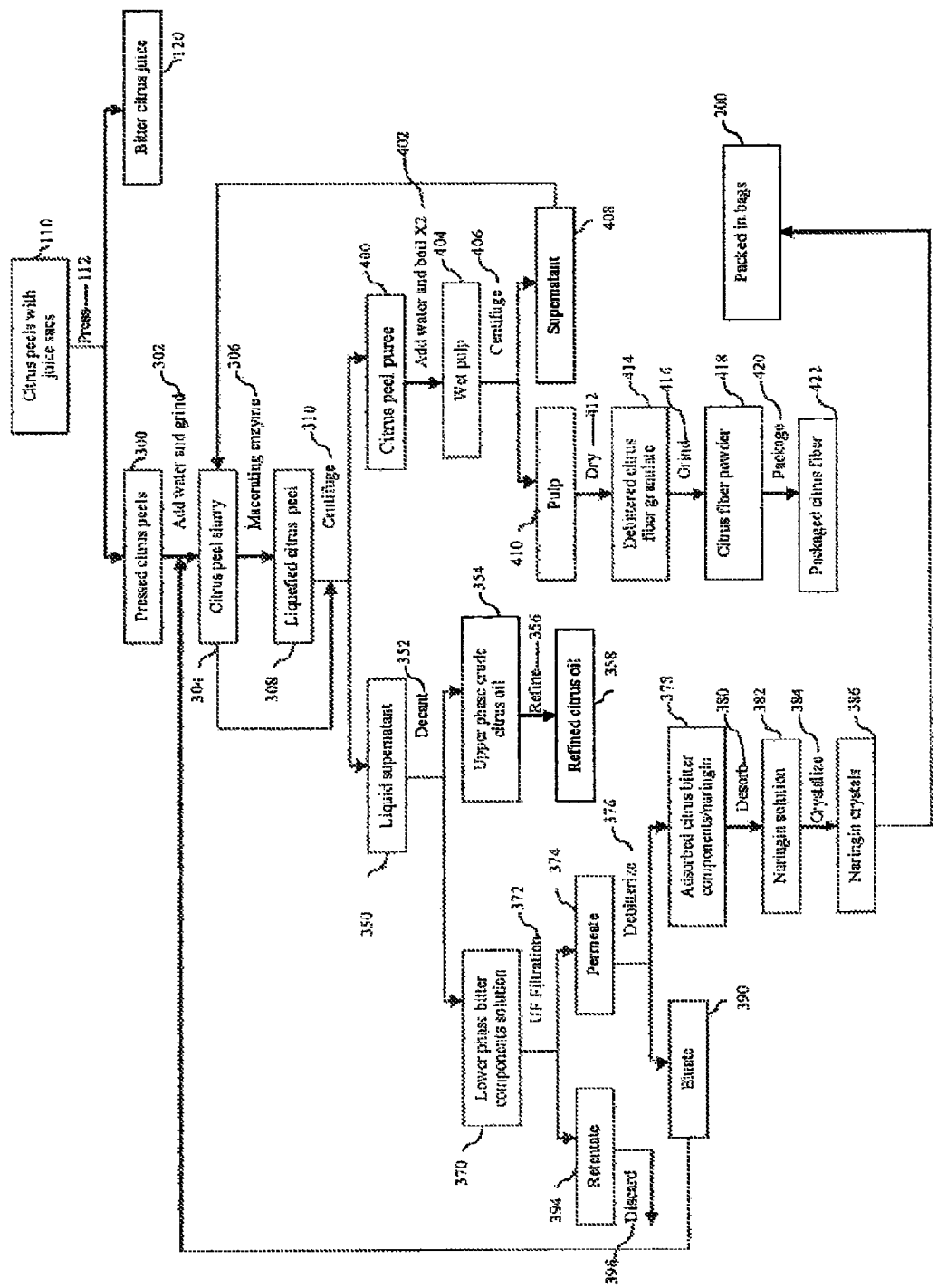
FIG. 2 is a diagram of embodiments of the invention for processes for collecting and refining citrus fiber, oil, and naringin from citrus peels.

Referring to FIG. 2, citrus peels with residual juice sacs attached 110 are pressed 112 to release citrus juice 120 (also shown in FIG. 3) from the juice sacs. The citrus juice 120 is bitter because it contains naringin and other bitter components. Conventional press equipment, such as, for example, a screw press or the like, can be used to press the peels. The press exerts pressure that can be adjusted to generate a desired yield of juice. For example, the press may be configured to exert pressure from about one psig to about 30 psig. The yield ranges from about 10% to about 60% by peel weight. This yield depends on the season of citrus harvest and the type of fruit being pressed. As shown in greater detail in FIG. 3, the bitter citrus juice 120 released by pressing is collected and then refined for use by a series of processing steps.

Figure 3:
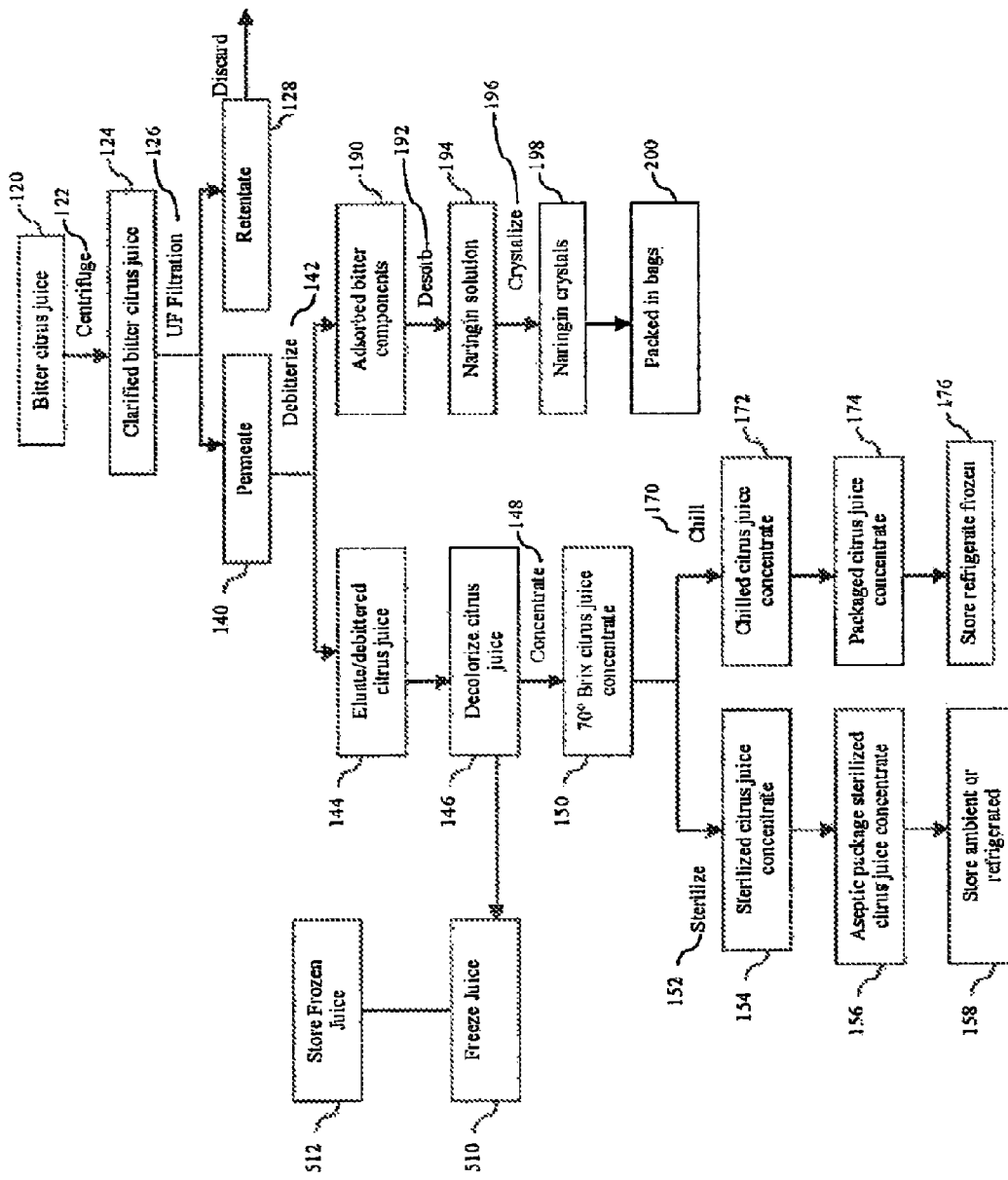
FIG. 3 is a continuation of the diagram of FIG. 1 showing processes for collecting and refining citrus juice and naringin from citrus peels.

Referring now to FIG. 3, the bitter citrus juice 120 is centrifuged 122, or alternatively filtered, to clarify the bitter citrus juice 124. The clarified juice 124 may then be filtered 126 with ultrafiltration or other filtration mechanism configured to collect retentate 128 comprising particulate matter, which is discarded. The juice that permeates the filter 140 is then processed to debitterize 142 and decolorize 146 the juice. This debittered and decolorized juice may be frozen and stored 510, 512 or concentrated 148 the juice into a desired ° Brix 150 and stored frozen 176 or sterilized and stored in refrigerated conditions 152, 158, as shown in FIG. 3 and described in further detail in the later portions of this disclosure.

Debittering Juice

Referring again to FIG. 3, the filtered bitter citrus juice 140 is debittered 142 by a process used to remove naringin 190. Debittering the juice improves its taste and consequently its consumer appeal. There are two processes—non-enzymatic and enzymatic—that may be used to debitter juice 142.

Debittering Juice by Non-Enzymatic Processes

A non-enzymatic process may be used to de-bitter citrus juice 142. A purpose for using this process is to recover naringin from the juice. Nondestructive recovery of naringin from juice uses non-ionic adsorbent resins (i.e., Mitsubishi SP710) or similar polystyrene resins designed to adsorb naringin and similar bitter components present in the citrus juice. The resins—packed into a column—are food grade polymers and may be regenerated and reused as long as the resins retain sufficient adsorptive capacity. The juice may be filtered with an ultrafiltration unit or other suitable means to remove suspended particles before the juice is passed through the resin-packed column to minimize fouling of the resin.

Filtered or unfiltered citrus juice is passed over the resin packed in the column at a flow rate optimized for adsorption 190 of naringin to the resin packed in the column. The flow rate may be in a range of about one bed volume (BV) to about 30 BV per hour or other preferred flow rate that maximizes adsorption of naringin. The flow rate may be optimized within a range from about 2 BV to about 5 BV per hour. The temperature of the citrus juice may range from about 32° F. to about 220° F. before, during, and after its passage through the column. In an embodiment, the juice temperature is about 70° F. The citrus juice collected from the column 144 may be cooled and stored or immediately transferred into the next phase of juice refining—the decolorizing step 146.

Debittering Juice by Enzymatic Processes

Alternatively, enzymes, such as naringinase, may be used to de-bitter the juice 142 by partially or totally removing naringin from the juice 140. Enzymatic processing is used if the goal is to remove, but not recover, naringin. Naturally occurring naringin is a glucoside containing a rhamnosyl group (rhamnoglucoside). Naringinase hydrolyzes the glucoside naringin converting it into naringinin (aglycone form of naringin) (FIG. 1) which is not bitter. During debittering 142, naringinase may be introduced to the citrus juice at a rate of about 0.001% to about 1.00% by weight at a temperature in a range of about 35° F. to about 150° F. Naringinase may be added to the juice 142 and held for a time ranging from about 5 minutes to about 5 hours to allow the enzyme to hydrolyze naringin dissolved in the juice. This enzymatic debittering 142 is complete when the naringin in the juice is hydrolyzed. The debittered juice 144 is then heated to a temperature ranging from about 165° F. to about 220° F. Debittered juice 144 is then cooled to about 35° F. to about 150° F. and stored or immediately transferred to the next phase of juice refining—the decolorizing step 146.

Decolorizing Juice

Debittered juice 144 is prepared for decolorizing 146. This preparation step differs from the process used to debitter the juice. The debittered citrus juice 144 may be filtered through ultrafiltration membranes if the juice was de-bittered with enzymes. In another embodiment, the debittered citrus juice 144 is decolorized 146 without pre-filtration if a non-enzymatic process of debittering was used.

The process for decolorizing juice 146 (as shown in FIG. 3) involves flow processing similar to debittering 142 except for the type of adsorbent resin packed in the column. In an embodiment, the decolorizing resin is a non-ionic adsorbent resin (i.e., Mitsubishi DCA11, an acrylic resin) or functionalized adsorbent resin (i.e., Dow Amberlite™ FPX66) with a weak base anion exchange characteristic. In alternative embodiments, a weak base anion exchange resin (i.e., Mitsubishi Diaions) or a strongly basic anion exchange resin (i.e., Mitsubishi Diaions) may be used for decolorizing 146 the debittered citrus juice 144. The resins used for decoloring are food grade polymers and may be regenerated and reused as long as the resins retain sufficient adsorptive capacity.

Decolorizing citrus juice 146 is accomplished by passing the juice through a column packed with a decolorizing resin. Decolorizing resin adsorbs unwanted colors and their precursors dissolved in the debittered citrus juice 144. The flow rate of the juice allows adsorption of color materials and their precursors to the resin packed in the column. The flow rate may be in a range of about 1 BV to about 30 BV per hour or other flow rate that optimizes adsorption of color materials and their precursors. In another embodiment, the flow rate may range from about 2 BV to about 5 BV per hour. The temperature of the juice may range from about 32° F. to about 220° F. before, during, and after its passage through the column. In an embodiment, the juice temperature is about 70° F. After the debittered citrus juice 144 is passed through the column, the resin in the column may be regenerated by washing the resin to remove adsorbed color materials and their precursors.

Concentrating Debittered and Decolored Juice

Referring now to FIG. 3, the decolorized citrus juice 146 eluted from the column is collected and concentrated 148 into a desired brix using conventional processes. In an embodiment, the degree Brix may be 70°. Decolorized citrus juice 146 is concentrated 148 into citrus juice 150 at ambient or reduced atmospheric pressure. As a non-limiting example, the pressure may be between about one inch of mercury to about 30 inches of mercury. In an embodiment, the concentrated citrus juice 150 may be prepared for packaging by sterilizing 152 the concentrated citrus juice 150 or, in alternative embodiments, by chilling 170 the concentrated citrus juice 150. The sterilized juice concentrate 154 may be aseptically packaged 156 and stored at ambient or refrigerated temperatures 158. The chilled juice concentrate 172 may be packaged 174 and stored in a refrigerator or freezer 176.

Alternatively, the decolorized citrus juice 146 may be frozen 510 and/or stored 512 for commercial use.

Extracting Naringin from Juice

After juice is passed through the debittering column, adsorbed naringin 190 is desorbed 192 from the resin using a solvent (as shown in FIG. 3) and removed from the resin-packed column in a solution. In an embodiment, the solvent is hot water. In other embodiments, different solvents may be used, such as, for example, alcohols, combinations of water and alcohol, or other solvents capable of desorbing naringin from the resin. The solvent desorbs naringin 192 from the resin in the column in a solution 194. The eluted naringin in solution 194 is recovered and may be crystallized 196 into pure naringin crystals 198 using conventional methods of crystallization. The naringin crystals 198 are packaged 200. The packaging may be hermetically sealed and impermeable to moisture to prevent rehydration of the packaged naringin crystals 198.

Processing Citrus Peels

Referring now to FIG. 2, the pressed citrus peels 300 are pulverized or ground in water 302 with grinding equipment to create a citrus peel slurry 304. Conventional grinding equipment, such as, for example, a Fitzmill or the like may be used to pulverize the citrus peels. The ratio of water to pulverized citrus peel may range from about 0.1 to about 200 times peel weight. Pulverized peel particles in the slurry may range from about 0.1 mm to about 10 mm in size. In another embodiment, the particles range from about 1 mm to about 2 mm in size. The slurry may be maintained in a storage tank or the like at a temperature ranging from about 0° F. to about 170° F. for a time period of about 2 hours up to about 1 year.

The citrus peel slurry 304 is processed by centrifugation 310 to separate citrus peel puree 400 from liquid supernatant 350. In an alternative embodiment, macerating enzymes 306 (for example, and without limitation, NovoShape™ from Novozymes, or CrystalZyme™ from Valley Research) is added to the citrus peel slurry 304 to create a liquefied citrus peel 308, which is then centrifuged 310, pressed, or filtered to separate citrus peel puree 400 from liquid supernatant 350. Citrus peel puree 400 is then processed to extract fiber, and the liquid supernatant 350 is processed to extract oil and naringin.

Extracting Fiber from Citrus Peel Puree

The citrus peel puree 400 is then washed (as shown in FIG. 2) by flushing with fresh water. The citrus peel puree 400 may be maintained with a water to peel weight ratio of about 0.1:1 to about 200:1. The effluent from the water flush may be recycled into the citrus peel slurry 304. After at least one flushing, the suspension of water and citrus puree 402 is boiled at least once by heating the slurry to a temperature between about 130° F. to about 230° F. After boiling, the water is removed from the boiled suspension of water and citrus peel puree 400 by pressing, bag filtering, ultrafiltering, or centrifuging 406 the suspension. Conventional press equipment, such as, for example, a screw press or the like, can also be used for pressing the citrus peel puree 400. The press may be used to exert pressure from about 0.1 psig to about 10 psig.

The supernatant 408, which contains soluble flavanoids and insoluble citrus oils, is recycled into the citrus peel slurry 304 and reprocessed. The sequence of adding water to the puree, boiling the suspension of water and citrus peel puree 400, and then removing the water from the citrus peel puree 400 may be repeated any number of times. In an embodiment, the sequence is repeated 3 times. Boiling the citrus peel puree 400, 402 increases solubility of the flavanoids, such as naringin. The purpose of the washing and boiling steps is to separate citrus peel fiber from the supernatant 408 comprising water, naringin, citrus oil, and the like released when pulverizing the citrus peels. The supernatant 408 is recycled into the citrus peel slurry 304, and the citrus peel puree 400 (now referred to as citrus pulp 410) is processed into citrus fiber as shown in FIG. 2 and described in further detail later in this disclosure.

Drying Citrus Fiber

Referring again to FIG. 2, the washed and debittered citrus pulp 410 is dried 412 into citrus fiber granulate 414 by conventional methods. The pulp 410 may be dried to reach a water content ranging from about 2% to about 95% by weight. In embodiments, the drying can occur with or without heat at atmospheric pressure. In alternative embodiments, the drying can occur with or without heat at a reduced pressure, such as under a vacuum. The washed and debittered citrus pulp 410 may be dried by other conventional methods such as, for example, freeze drying, spray drying, drum drying, Infra Red radiation, or the like. The fiber granulate 414 may be ground 416 into citrus fiber powder 418. The fiber granulate 414 may be ground at different mesh sizes ranging from about 4 mesh Tyler to about 200 mesh Tyler or finer.

The fiber granulate 414 and citrus fiber powder 418 comprise mostly dried dietary fiber and pectin. The total dietary content of the particles may range from about 5% to about 95% by weight. And the soluble fiber of the particles may range from about 5% to about 95% by weight. In an embodiment, the final moisture content may range from about 0.5% to about 20% by weight. Citrus fiber granulate 414 may be packaged at various sizes. The packaging may be hermetically sealed and impermeable to moisture to prevent rehydration of the packaged citrus fiber 422.

Purifying Naringin and Citrus Oil

Referring to FIG. 2, the supernatant 350 removed from the centrifuged citrus peel puree 400 comprises solubilized naringin, crude citrus oil, and other citrus peel components released from the citrus peel during grinding 302. The supernatant 350 may be centrifuged or allowed to separate by gravity into an upper phase 354, which contains crude citrus oil, and a lower phase 370, which contains solubilized citrus components including naringin. The crude citrus oil is refined 356 using commercial techniques into pure citrus oil 358.

The lower phase 370 of the supernatant 350, which includes naringin, is filtered, for example, with ultrafiltration to extract soluble naringin. The retentate 394 of ultrafiltration is collected and discarded 396. The permeate 374 of ultrafiltration is debittered 376 similar to the processes used to debitter juice. The permeate 374 of ultrafiltration is passed through a column packed with debittering resins. The resins adsorb naringin and allow most other components of the permeate to elute through the column. In an embodiment, the un-adsorbed permeate eluate 390 is recycled into the water used during citrus peel grinding 302 or, alternatively, is discarded. The adsorbed naringin 378 is then desorbed 380 from the resin using a suitable solvent, such as, for example, hot water, alcohol, or a mixture of both. The naringin solution 382 is captured and then crystallized 384 into naringin crystals 386 by conventional methods. The naringin crystals 386 are packaged and sealed into bags 200.

While the invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as fall within the scope of the claims below.

What is claimed is:

1. A process for converting citrus peel waste into citrus oil, citrus fiber, and naringin comprising:
   pressing citrus peels having residual vesicles attached thereto with sufficient pressure to release citrus juice from within the vesicles;
   removing the citrus juice from the pressed citrus peels;
   pulverizing the citrus peels in water to create a slurry of particles;
   separating the slurry of particles into citrus peel puree and a first supernatant, wherein the first supernatant comprises solubilized naringin and citrus oil; and
   collecting debittered citrus pulp from the citrus peel puree using a washing process, wherein the washing process comprises creating a suspension of the citrus peel puree in water, heating the suspension to a temperature ranging from about 150° F. to about 230° F. and then separating the suspension into debittered citrus pulp and a second supernatant.

2. The process of claim 1 wherein the pressing comprises applying force to the citrus peels in a range of about 5 psig to about 15 psig.

3. The process of claim 1 wherein the slurry of particles comprises peel particles in a range from about 0.1 mm to about 10 mm in size.

4. The process of claim 1 wherein the slurry of particles comprises a ratio of water to peel particles ranging from about 0.1:1 to about 200:1 by weight.

5. The process of claim 1 comprising combining a macerating enzyme with the slurry of particles to liquefy the particles.

6. The process of claim 1 wherein the step of separating the slurry of particles into citrus peel puree and a first supernatant comprises decanting, centrifuging, pressing, or filtering.

7. The process of claim 1 comprising separating the first supernatant into citrus oil and soluble citrus components comprising naringin using centrifugation or gravity separation.

8. The process of claim 7 comprising refining the citrus oil.

9. The process of claim 7 comprising filtering the soluble citrus components and then passing the filtered soluble citrus components comprising naringin over an adsorbent resin, wherein the naringin is adsorbed to the resin and removed from the filtered soluble citrus components.

10. The process of claim 9 comprising desorbing naringin adsorbed to the resin with a solvent and eluting the naringin in a solution.

11. The process of claim 10 wherein the naringin in the solution is crystallized.

12. The process of claim 1 comprising recycling the second supernatant into the slurry of particles.

13. The process of claim 1 wherein the washing process is repeated at least one time.

14. The process of claim 1 wherein the washing process is repeated 3 times.

15. The process of claim 1 comprising drying the debittered citrus pulp into a fiber granulate.

16. The process of claim 15 wherein the fiber granulate comprises a moisture content in a range of about 0.5% to about 20% by weight.

17. The process of claim 15 wherein the drying of the debittered citrus pulp can occur with or without heat at atmospheric pressure or in a vacuum.

18. The process of claim 15 wherein the fiber granulate has a total dietary content ranging from about 5% to about 95% by weight.

19. The process of claim 15 wherein the fiber granulate has a crude dietary fiber content ranging from about 5% to about 95% by weight.

20. The process of claim 15 wherein the fiber granulate has a soluble fiber content ranging from about 5% to about 10% by weight.

21. The process of claim 15 comprising pulverizing the fiber granulate into sizes ranging from about 4 mesh Tyler to about 200 mesh Tyler.

22. The process of claim 1 comprising converting the citrus juice into a debittered juice by using a non-enzymatic process or an enzymatic process.

23. The process of claim 22 wherein the non-enzymatic process comprises passing the citrus juice over a resin and collecting debittered juice, wherein the resin adsorbs naringin thereby removing naringin from the citrus juice.

24. The process of claim 23 comprising desorbing naringin adsorbed to the resin with a solvent and eluting the naringin in a solution.

25. The process of claim 24 wherein the naringin in the solution is crystallized.

26. The process of claim 23 comprising flowing the debittered juice over decolorizing resin, wherein the decolorizing resin adsorbs unwanted colors and color precursors.

27. The process of claim 22 wherein the enzymatic process comprises converting the citrus juice into debittered juice by hydrolyzing soluble naringin with an enzyme.

28. The process of claim 27 wherein the enzyme is added to the citrus juice at a rate of about 0.001% to about 1.00% by weight of the citrus juice for about 5 minutes to about 5 hours, wherein the temperature of the citrus juice is about 35° F. to about 150° F.

29. The process of claim 27 comprising inactivating the enzyme after soluble naringin is hydrolyzed by heating the debittered juice with enzyme added thereto to a temperature ranging from about 165° F. to about 220° F.

30. The process of claim 29 comprising filtering the debittered juice through a filtration membrane and then flowing the filtered, debittered juice over decolorizing resin, wherein the decolorizing resin adsorbs unwanted colors and color precursors.

31. The process of claim 29 comprising centrifuging the debittered juice, removing a supernatant from the centrifuged, debittered juice, and then flowing the supernatant comprising naringin over decolorizing resin, wherein the decolorizing resin adsorbs unwanted colors and color precursors.

32. A process for extracting citrus oil, naringin, juice, and citrus fiber from citrus peel waste comprising:
pressing citrus peels having residual vesicles attached thereto with sufficient pressure to release citrus juice from within the vesicles, wherein the citrus juice is removed from the citrus peels;
pulverizing the citrus peels in water to create a slurry of particles;
separating the slurry of particles into citrus peel puree and a first supernatant, wherein the first supernatant comprises solubilized naringin and citrus oil;
collecting debittered citrus pulp from the citrus peel puree using a washing process, wherein the washing process comprises creating a suspension of the citrus peel puree in water, heating the suspension to a temperature ranging from about 150° F. to about 230° F. and then separating the suspension into the debittered citrus pulp and a second supernatant; and
separating the first supernatant into citrus oil and soluble citrus components comprising naringin.

33. The process of claim 32 wherein the slurry of particles comprises a ratio of water to peel particles ranging from about 0.1:1 to about 200:1 by weight.

34. The process of claim 32 wherein the slurry of particles comprises peel particles in a range from about 0.1 mm to about 10 mm in size.

35. The process of claim 32 wherein the process comprises adding a macerating enzyme to the slurry of particles to liquefy the particles.

36. The process of claim 32 wherein the step of separating the slurry of particles into citrus peel puree and a first supernatant comprises decanting, centrifuging, pressing, or filtering.

37. The process of claim 32 wherein the step of separating the first supernatant into citrus oil and soluble citrus components comprises using centrifugation or gravity separation.

38. The process of claim 37 comprising filtering the soluble citrus components and passing the filtered soluble citrus components comprising naringin over an adsorbent resin, wherein the naringin is adsorbed to the resin.

39. The process of claim 38 comprising desorbing naringin adsorbed to the resin with a solvent and eluting the naringin in a solution.

40. The process of claim 38 wherein the naringin in the solution is crystallized.

41. The process of claim 32 comprising drying the debittered citrus pulp into fiber granulate.

42. The process of claim 32 comprising passing the citrus juice over a resin, wherein the resin adsorbs naringin thereby removing naringin from the citrus juice.

43. The process of claim 42 comprising desorbing naringin adsorbed to the resin with a solvent and eluting the naringin in a solution.

44. The process of claim 43 wherein the naringin in the solution is crystallized.

45. A process for reducing citrus peel waste from citrus juice or segmenting processing comprising:
pressing citrus peels having residual vesicles attached thereto with sufficient pressure to release citrus juice from within the vesicles, wherein the citrus juice is removed from the citrus peels;
pulverizing the citrus peels in water to create a slurry of particles;
separating the slurry of particles into citrus peel puree and a first supernatant, wherein the first supernatant comprises solubilized naringin and citrus oil;
collecting a debittered citrus pulp comprising dietary fiber using a washing process, wherein the washing process comprises creating a suspension of the citrus peel puree in water, heating the suspension to a temperature ranging from about 150° F. to about 230° F. and then removing a second supernatant from the debittered citrus pulp, and wherein the second supernatant is recycled into the slurry of particles; and
separating the first supernatant into citrus oil and soluble citrus components comprising naringin.

46. A process for eliminating pollution generating solvents from processing citrus peel waste comprising:
pressing citrus peels having residual vesicles attached thereto with sufficient pressure to release citrus juice from within the vesicles, wherein the citrus juice is removed from the citrus peels;
pulverizing the citrus peels in water to create a slurry of particles;
separating the slurry of particles into citrus peel puree and a first supernatant, wherein the first supernatant comprises solubilized naringin and citrus oil;
collecting a debittered citrus pulp comprising dietary fiber from the citrus peel puree using a washing process, wherein the washing process comprises creating a suspension of citrus peel puree in water, heating the suspension to a temperature ranging from about 150° F. to about 230° F. and then removing a second supernatant from the debittered citrus pulp, and wherein the second supernatant is recycled into the slurry of particles; and
separating the first supernatant into citrus oil and soluble citrus components comprising naringin.

47. A process for extracting citrus oil from citrus peel waste produced from juicing or segmenting operations comprising:
pressing citrus peels with mechanical force ranging from about 5 psig to about 15 psig to extract citrus juice from vesicles attached to the citrus peels;
grinding the citrus peels in water to create a slurry of peel particles;
combining a macerating enzyme with the slurry of peel particles to liquefy the peel particles;
removing a liquid from the slurry peel particles by pressing, centrifuging, or filtering the slurry of peel particles, wherein the liquid comprises citrus oil and soluble flavanoids;
separating the liquid into a water soluble phase and a water-insoluble phase comprising citrus oil; and removing the water-insoluble phase from the water soluble phase and refining the water-insoluble phase into citrus oil.

* * * * *